INVENTORS.
André Bechler
Armin Allenbach.
Auguste Bueche

INVENTORS.
ANDRÉ BECHLER.
ARMIN ALLENBACH.
AUGUSTE BUECHE.
BY
ATTORNEY.

Patented Dec. 2, 1952

2,619,712

UNITED STATES PATENT OFFICE 2,619,712

BAR GUIDING DEVICE FOR AUTOMATIC LATHES

André Bechler, Armin Allenbach, and Auguste Bueche, Moutier, Switzerland, assignors to André Bechler S. A., Moutier, Switzerland, a joint stock company of Switzerland Application January 4, 1951, Serial No. 204,422
In Switzerland February 2, 1950

5 Claims. (Cl. 29—59)

The present invention relates to a bar-guiding device for automatic lathes of the kind in which the guiding organ intended to receive the bar is composed of a plurality of pieces for the purpose of reducing the noise.

Bar guiding devices of this kind are already known in the art. They have brought a noticeable progress, but further development and tests have shown that the noise caused by the bar rotating in the guiding device may still be considerably reduced when the parts are arranged according to the present invention. According to this invention the pieces intended to receive the bar are made of leaf springs having an inner portion and outer portions, the latter being mounted on supporting means in such a way as to permit the inner portion of each leaf spring, to yield in all radial directions.

Preferably each outer portion extends at a certain distance along the major portions of the adjacent half of the inner portion and surrounds with its end the major part of the circumference of a longitudinal rod pertaining to said supporting means.

Other objects of our invention will appear hereinafter as the description of the invention proceeds, the novel features, combinations and constructions being more particularly pointed out in the specification and the claims hereunto appended.

The annexed drawing shows, by way of examples, three embodiments of the bar guiding device according to the invention.

Figure 1:
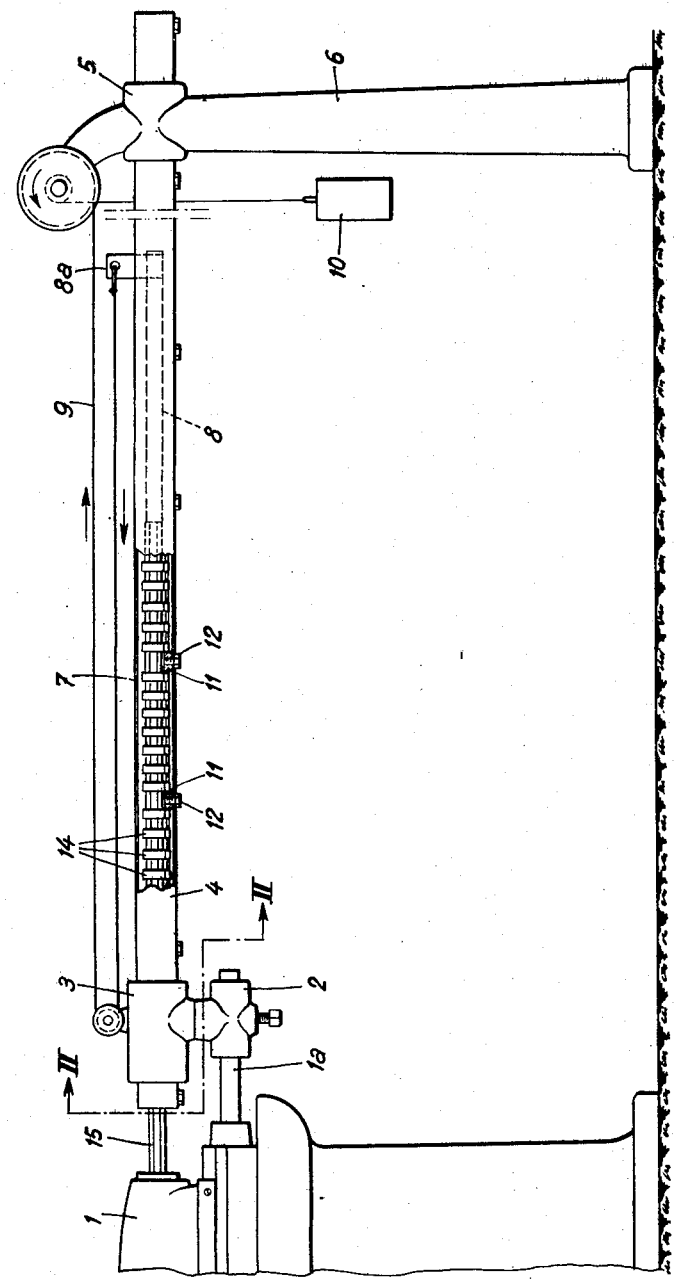
Fig. 1 is an elevational, partly sectional view of the first embodiment of the bar guiding device and of a portion of a automatic lathe to which the device is adapted.

In the drawings, and particularly in Fig. 1, the bed of the automatic lathe is indicated at 1 and is fitted in the usual manner with an horizontal support 1a on which a body 2 carrying a sleeve 3 may be slid.

A protection tube 4 has one of its ends fixed in the sleeve 3 whilst its other end is fixed in the sleeve 5 supported by a post 6.

The protection tube 4 is made with a longitudinal slot 7 constituting a guideway for a push piece 8 which is actuated by means of a device which is well known in the art and which comprises a rope or cable 9 and a weight 10.

Two longitudinal rods 13 are fixed at regular distances apart from one another in the protecting tube 4 by means of fixing pieces 11 and of screws 12. These longitudinal rods 13 are disposed symmetrically with regard to a vertical diametrical plane of tube 4, which plane contains also the slot 7. Leaf springs 14 and spacing collars 24 are arranged in an alternative sequence on said rods 13, the spacing collars 24 being, however, replaced at regular intervals by said fixing pieces 11.

Figure 2:
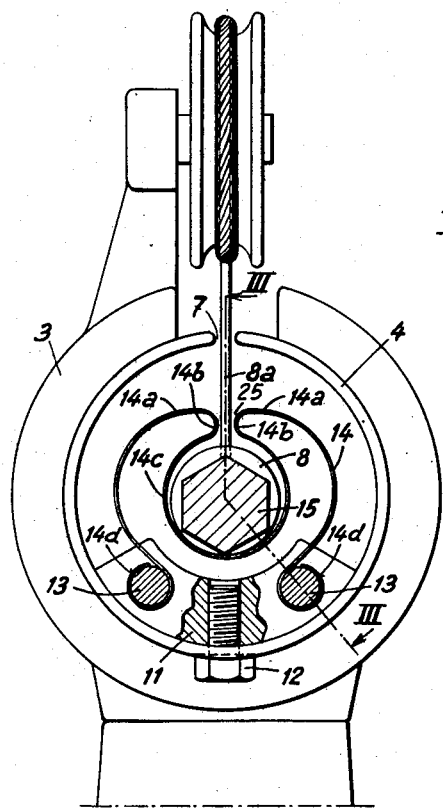
Fig. 2 is a transverse sectional view along line II—II of Fig. 1, at an enlarged scale.

The leaf springs 14 include each an inner portion 14c extending along the major part of a circle while letting free an opening 25 at the uppermost section of this circle, two relatively small, outwardly bent portions 14e adjoining the inner portion 14c and letting free said opening 25, and outer portions 14a adjoining the portions 14b. As shown by Fig. 2, each outer portion 14a extends at a certain distance along the major part of the adjacent half of the circle of the inner portion 14c, said distance being not necessarily constant. Moreover, each outer portion surrounds with its end 14d, located away from the portion 14b, the major part of the circumference of one of the longitudinal rods 13. It may easily be understood that under these circumstances the inner portion 14c of each leaf spring 14, intended to receive the bar to be guided, may yield in all radial directions, thereby damping the vibrations of the bar 15 forming the work piece, so that the noise produced by the contact of this bar with the guiding device is substantially reduced. It should be noted that, of course, the openings 25 of the leaf springs 14 must be in alignment with the longitudinal slot 7 of the protecting tube 4, so that the pushpiece 8, a lateral portion 8a of which extends through said openings 25 and the slot 7, is not hindered in its movements.

Figure 4:
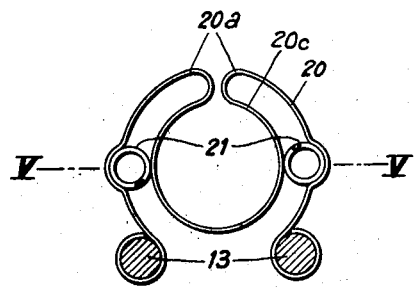
Fig. 4 is a transverse sectional view of a second embodiment.
Figure 5:
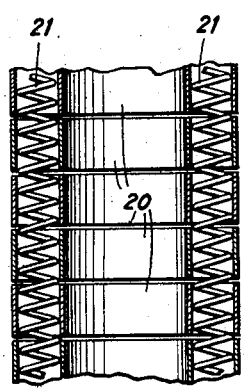
Fig. 5 is a horizontal sectional view, taken along line V—V of Fig. 4, of a section of the guiding device.
Figure 3:
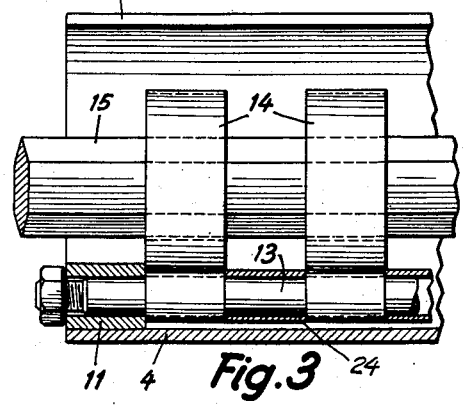
Fig. 3 is a longitudinal sectional view of a section of the device along the broken line III—III of Fig. 2.

A first modification (or second embodiment) is shown in Figs. 4 and 5 of the drawings. In this modification, the rods 13 correspond to the rods 13 of Figs. 1 and 3, and the leaf springs 20 to the leaf springs 14, of the above described embodiment. The shape of the leaf springs 20 has not substantially changed, but the outer portions 20A thereof are drawn or pressed outwardly at the level of the center of the quasi-circular inner portion. Yielding members constituted by coiled springs 21 are introduced into the so formed enlarged gaps on each side of the inner portion 20c of leaf spring; they are held in place and resiliently urged against this inner portion, by the radially inwardly directed spring pressure of the corresponding outer portions 20a. The several leaf springs 20, which may be close to each other as shown by Fig. 5 or at a distance from one another as in the embodiment of Figs. 1 to 3, are prevented by the yielding members 21 from bending to an extent which would lead to an excessive lateral shift of two consecutive leaf springs with regard to each other, thereby impeding the function of the device and of the lathe.

Figure 6:
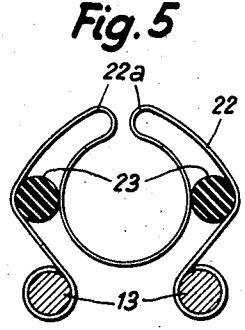
Fig. 6 is a transverse sectional view similar to Fig. 4, of a third embodiment.

The modification shown in Fig. 6 differs only slightly from that of Figs 4 and 5. This is also true for the leaf springs indicated at 22. The supporting rods are again indicated at 13. The main difference resides in the fact that the yielding members elastically held in place between the outer portions 22a and inner portion of the several leaf springs 22 are constituted by ropes 23 of a yielding material, for example of leather or of rubber.

It is self-explanatory that several further modifications could be made to the bar guiding device hereabove described without departing from the scope or spirit of the invention. In particular the outer portions of the leaf springs may be bent backwardly in any other way permitting to the inner portions of these leaf springs to yield in all radial directions.

What we claim is:

1. A bar guiding device for automatic lathes, comprising means intended to receive the bar, these means being composed of a plurality of pieces for the purpose of reducing the noise, each of these pieces being constituted by a leaf spring including as constituting portions an inner portion extending along the major part of a circle while letting free an opening at the uppermost section of this circle, two relatively small outwardly bent portions adjoining said inner portion and letting free said opening, and two outer portions adjoining said outwardly bent portions and extending along the major part of the adjacent half of the circle of the inner portion at a distance from this half, the device comprising furthermore supporting means including a pair of longitudinal rods, the ends of said outer portions surrounding the major part of the circumference of the adjacent one of these rods, whereby said inner portion of each leaf spring is permitted to yield in all radial directions.

2. The bar guiding device of claim 1, in which said supporting means include furthermore a protecting tube made with a longitudinal slot, fixing pieces screwed to the inner side of said tube at regular distances from one another and made each with a pair of bores traversed by said rods, and distance collars located on said rods between the leaf springs which are not separated by said fixing pieces.

3. A bar guiding device for automatic lathes, comprising in combination, means intended to receive the bars, which are composed of a plurality of pieces for the purpose of reducing the noise, each of these pieces being constituted by a leaf spring including as constituting portions an inner portion extending along the major part of a circle while letting free an opening at the uppermost section of this circle, two relatively small outwardly bent portions adjoining the inner portion and letting free said opening, and two outer portions adjoining said outwardly bent portions and extending along the major part of the adjacent half of the circle of the inner portion at a distance from this half to form a gap therebetween, the width of this gap increasing to a maximum substantially in its middle portion, supporting means including a pair of longitudinal rods, each of said outer portions having its end fastened to one of said supporting rods, and yielding members extending parallelly to said supporting rods through the middle portions of said gaps and in resilient engagement with said leaf springs.

4. The bar guiding device of claim 3, in which said yielding members are constituted by coiled springs.

5. The bar guiding device of claim 3, in which said yielding members are constituted by ropes of yielding material.

ANDRÉ BECHLER.
ARMIN ALLENBACH.
AUGUSTE BUECHE.

REFERENCES CITED

The following references are of record in the file of this patent:

UNITED STATES PATENTS

| Number | Name | Date |
|---|---|---|
| 827,826 | Stoecklein et al. | Aug. 7, 1906 |
| 1,915,058 | French | June 20, 1933 |

FOREIGN PATENTS

| Number | Country | Date |
|---|---|---|
| 481,959 | Germany | Aug. 30, 1929 |
| 694,393 | Germany | July 31, 1940 |